United States Patent [19]

Krause et al.

[11] 4,292,175
[45] Sep. 29, 1981

[54] COMPACT ELECTROCATALYTIC SEWAGE TREATMENT UNIT FOR MARITIME USE

[75] Inventors: William A. Krause; Leonard E. Langeland, both of Houston, Tex.

[73] Assignee: Omnipure, Inc., Houston, Tex.

[21] Appl. No.: 63,581

[22] Filed: Aug. 3, 1979

[51] Int. Cl.³ ............................ C02F 1/46; C02F 1/76
[52] U.S. Cl. ................................... 210/192; 204/149; 210/218; 210/754
[58] Field of Search ............... 204/149, 151, 152, 275, 204/276; 210/192, 218, 754

[56] References Cited

U.S. PATENT DOCUMENTS

| | | | |
|---|---|---|---|
| 3,925,176 | 12/1975 | Okert | 204/152 |
| 3,975,247 | 8/1976 | Stralser | 204/152 |
| 4,121,993 | 10/1978 | Krugmann | 204/275 |
| 4,179,347 | 12/1979 | Krause et al. | 204/149 |

Primary Examiner—G. L. Kaplan
Attorney, Agent, or Firm—Seed, Berry, Vernon & Baynham

[57] ABSTRACT

A compact, relatively small unit for treatment of wastewater for discharge into maritime waters is disclosed. The wastewater is received in a surge or retention tank and is delivered by gravity flow or pumped to a macerator for comminution of the solids content of the wastewater. Prior to entering the macerator, salt water on a controlled flow basis is added to the wastewater in sufficient amounts to insure a high enough salt content for use as the electrolyte in an electrocatalytic cell. From the macerator the wastewater to be treated is directed into a vertically oriented, elongated, electrocatalytic cell having a plurality of parallel, closely spaced electrodes therein positioned parallel to the flow of wastewater therethrough. The wastewater is directed through the electrocatalytic unit. The end electrodes of the spaced electrode plates are connected to a source of direct current sufficient to generate chlorine, oxygen and other treating chemicals in situ. The gases generated in the cell, entrained with the liquid, flow out of the electrocatalytic cell with the liquid into the standpipe of an effluent tank where a negative pressure separates the entrained gases from the liquid and vents them to the atmosphere. The heavier solids remaining in the discharged treated liquid are allowed to settle in the bottom of the effluent tank and the remaining effluent is discharged.

6 Claims, 3 Drawing Figures

COMPACT ELECTROCATALYTIC SEWAGE TREATMENT UNIT FOR MARITIME USE

BACKGROUND OF THE INVENTION

1. Field of the Invention

This invention is directed to a unit for maritime use for the electrocatalytic treatment of wastewater containing suspended organic solids and pathogenic organisms.

2. Description of the Prior Art

The electrolytic treatment of sewage water mixtures to both disinfect sewage and remove a portion of the suspended solids therefrom is known. Reference is made, for example, to the following United States patents disclosing electrolytic treatment of sewage-water: U.S. Pat. Nos. 3,616,355; 3,756,933; 3,764,500; 3,766,033; 3,856,642; 3,925,176; 3,939,499; 3,943,044; 3,975,247; 3,975,256; 4,009,104; and 4,045,314. Reference is also made to U.S. application Ser. No. 882,264 filed Feb. 28, 1978 and now U.S. Pat. No. 4,179,347, which discloses an electrocatalytic treatment system wherein a measured quantity of an electrolyte, generally salt, is added to an influent wastewater stream and the wastewater stream is passed through a plurality of closely spaced planar electrocatalytically active electrodes where chlorine, oxygen and other disinfecting chemicals are generated in situ. Foam containing entrained suspended solids are removed from the cell and the treated wastewater stream is discharged from the treatment vessel into a filter for removal of fibrous residual suspended solids. The amount of residual chlorine present in the treated wastewater stream discharged from the electrocatalytic treatment vessel is controlled by measurement of the conductivity of the wastewater stream entering the electrolytic treatment vessel and control of the amount of electrolyte added to the incoming stream.

Water pollution control permits are increasingly being required for any type of vessel which moves on the water within the territorial limits, both in the United States and other countries. In the United States the Coast Guard is responsible for issuing of such permits. The standards required for discharge of effluent into maritime waters are becoming more and more severe in terms of suspended solids content, level of BOD and fecal coliform count. Vessels operating within the territorial waters either have to have holding tanks to receive all wastewater and hold it until it can be pumped to an on-shore treatment facility or the vessel will have to have a treatment facility on board capable of treating the wastewater such that the effluent discharged meets designated standards. The on-board treatment systems generally available today are expensive, hard to maintain, require chemical additives and are bulky. It has remained a problem to develop a compact, low weight, relatively small low-cost unit which may be used for new vessels or to retrofit existing vessels.

SUMMARY OF THE INVENTION

It is a primary object of this invention to provide a compact, relatively small low-weight unit for treatment of wastewater by electrocatalytic means, primarily for discharge into maritime waters, the unit requiring only a source of electrical power of the capacity that is generally capable of being supplied by the vessel's electric generator.

It is a further object of this invention to provide a unit for the electrocatalytic treatment of wastewater streams wherein the electrocatalytic cell has electrode plates cast in place parallel to the flow of wastewater therethrough using a castable synthetic polymer.

It is a further object of this invention to provide a unit for treatment of wastewater wherein the wastewater is initially received in a surge tank, mixed with a measured quantity of salt water or sea water, macerated and flowed through an electrocatalytic cell where oxygen, chlorine and other disinfecting chemicals are generated in situ, the effluent discharged into an effluent tank where heavier solids are allowed to settle in the tank for recycling and where gases entrained in the treated wastewater discharged from the cell are vented to the atmosphere by creating a negative pressure in the standpipe of the effluent tank.

It is a further object of this invention to provide an electrocatalytic system for treatment of wastewater wherein the direct current supplied to the electrocatalytic cell is automatically varied to meet the resistance characteristics of the wastewater being treated.

These and other objects are accomplished by a unit which utilizes an elongated electrocatalytic cell having an inlet and outlet, the cell containing a plurality of closely spaced electrodes between the inlet and outlet thereof parallel to one another and parallel to the flow of wastewater to be treated, the electrodes cast in place in the cell with an electrically non-conductive, castable, synthetic polymer. A surge tank receives the wastewater to be treated and holds it to allow separation of non-maceratable solids and also even out the flow rate of wastewater through the cell. The wastewater is received from the receiving tank and directed to a macerator for maceration of the solids content of the wastewater. The macerator discharges the macerated solids to the electrocatalytic cell. Means are provided to add a constant flow of an electrically conductive salt solution, such as seawater, to the wastewater before entry of the wastewater into the electrocatalytic cell in an amount to provide sufficient electrolyte for operation of the electrocatalytic cell. An effluent tank receives the treated water discharged from the electrocatalytic cell, the effluent tank including means for creating a negative pressure therein to separate and vent the entrained gases to the atmosphere. Power means deliver a charge of direct current to each of the end electrode plates in the electrocatalytic cell, the electrical current charging the spaced electrode plates with an electrolyzing current for generation of chlorine, oxygen and other disinfecting chemicals in situ. Control means connected to the power means to adjust the voltage delivered to the electrodes to respond to variations in the conductivity of the wastewater being treated.

DETAILED DESCRIPTION OF THE PREFERRED EMBODIMENTS

The wastewater treatment unit described is particularly designed for operation on vessels operating in seawater or brackish water where the salt content of the water may be as low as 0.6% or more by weight or a solution saturated with salt. The system is designed to operate on black water and/or gray water and/or a combination of both on a continuous, semi-continuous or intermittent basis. The entire unit is compact, requires no chemical additives, is not costly to maintain and treats wastewater effectively.

Figure 1:
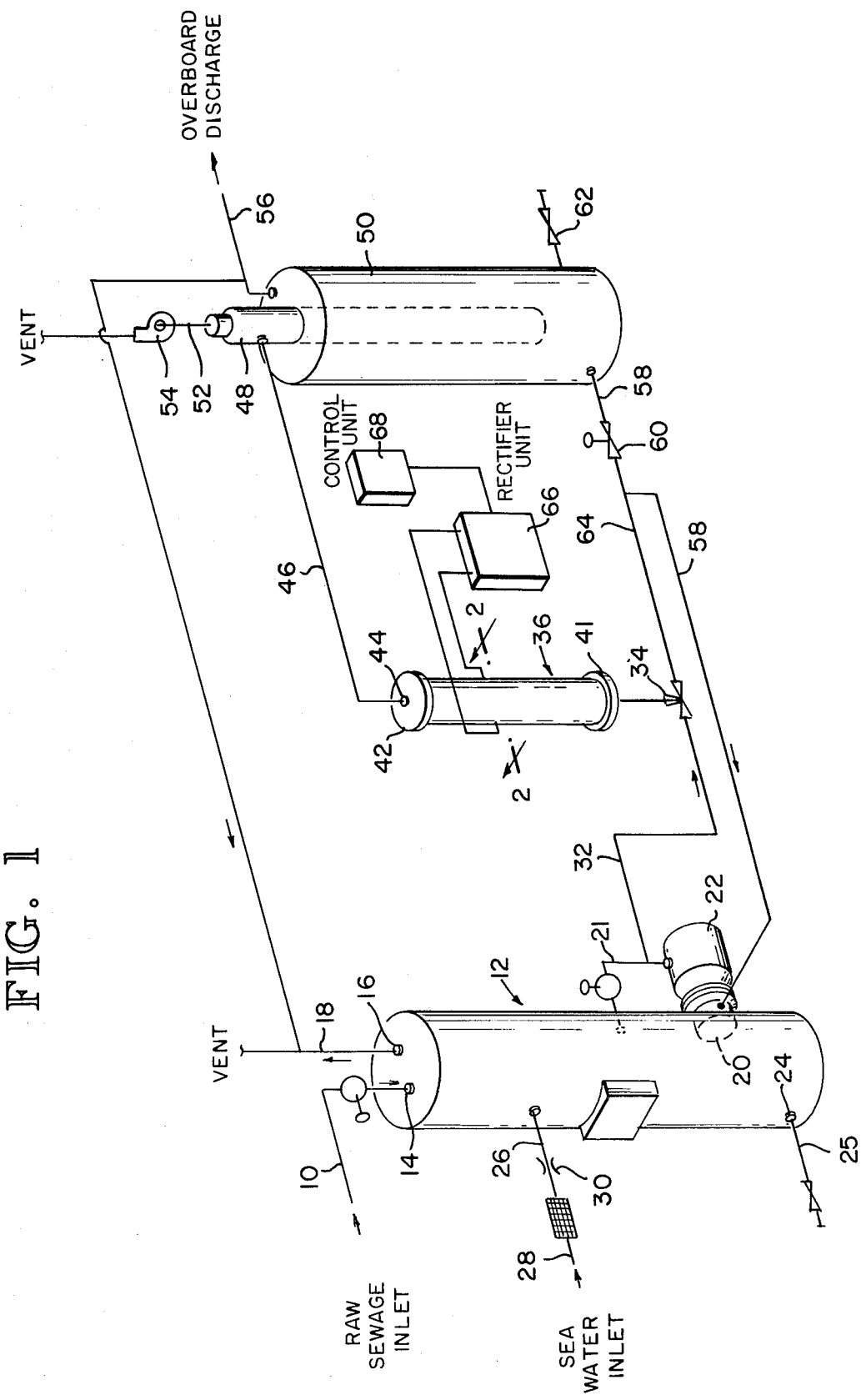
FIG. 1 is a flow diagram of the overall system for electrocatalytic treatment of wastewater.

FIG. 1 illustrates the overall flow sheet for the system. Referring to FIG. 1, the sanitary system collection headers for the vessel are directed to feed into line 10 which leads to a surge or retention tank 12. The purpose of the retention tank is a dual one: (1) to separate heavy solids from the wastewater which would damage the macerator by gravity and (2) to even out the flow of wastewater through the electrocatalytic cell. Generally, the retention tank 12 is sized to accommodate 10% of the daily volume of wastewater to be treated. The retention tank 12 includes an inlet opening 14, a vent opening 16 connecting with a vent line 18, a discharge opening 20 leading to the inlet of a macerator unit 22 and a discharge opening 24 connecting to a line 25 for draining of the tank if necessary. The retention tank also includes an inlet opening 26 connecting with line 28 through which seawater or brackish water is pumped. Line 28 includes a restriction orifice 30 for restricting the flow of salt-containing water into the retention tank. The flow rate of seawater into the tank 12 is set to allow continuous operation of the electrocatalytic cell during periods when no wastewater is entering the retention tank. Additionally, the sea water provides the necessary electrolyte for efficient operation of the electrocatalytic cell. The tank 12 may also be provided with a high level alarm connected to alert an operator should the liquid level in the tank 12 exceed the desired amount.

The wastewater to be treated is pumped from the retention tank into the macerator unit 22 which grinds and communutes the solids content of the wastewater to a particle size, preferably not greater than 1/16 inch. From the macerator the wastewater stream is pumped or flows by gravity through line 32 and valve 34 upward through the electrocatalytic cell 36. Valve 34 is a three-way valve which may be solenoid operated for automatic back flush of the unit as will be described later.

Figures 2, 3:
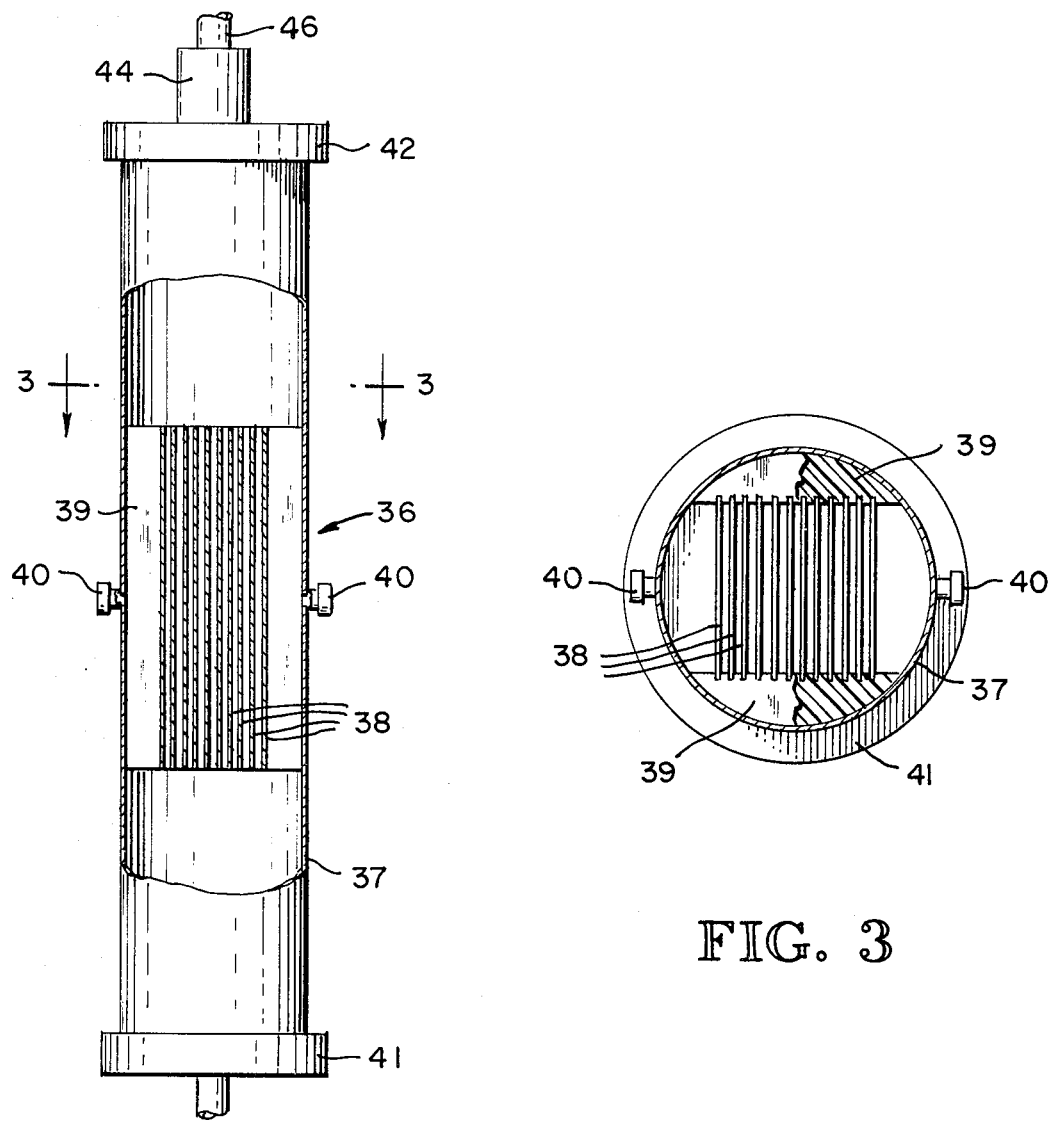
FIG. 2 is a perspective of the electrocatalytic cell with portions broken away illustrating the positioning of the electrode plates within the cell.
FIG. 3 is a cross-sectional view of the cell along line 3—3 of FIG. 2.

The electrocatalytic cell is shown in greater detail in FIG. 2. It comprises an outer housing 37 containing a plurality of electrode plates 38 spaced about $\frac{1}{4}$ inch apart within the housing. The parallel electrode plates are cast in place in the housing using a castable, nonconductive polymer 39 such as a polyester resin, acrylic resin, etc. Each of the electrode plates, both anode and cathode, are preferably dimensionally stable electrodes of a suitable electrically conductive substrate metal with a surface coating thereon of a solid solution of a precious metal or metal oxide or mixture of precious metals or metal oxides. Electrodes of this type and their manufacture is described, for example, in British Pat. No. 1,195,871 and U.S. Pat. No. 3,624,873. In the embodiment shown in FIG. 2 the electrodes are spaced about $\frac{1}{4}$ inch apart across the width of the electrolytic cell. Only the end electrode plates are connected to a source of direct current through the connectors 40; however, more than the end plates may be connected to a source of direct current if desired. Current of from 2 to 100 amperes, preferably 8 to 60 amperes, at 15 to 110 volts is delivered to the electrode plates from a suitable rectifier unit 66. The average voltage between the plates may range from 2 to 6 volts, preferably 3 to 4 volts. Stray voltage on the electrodes may be controlled by attaching plastic insulators of the same thickness as the electrode plate to the end of the plate, the insulators held in place by the castable polymer fixing the electrode plate in position. Another method of eliminating stray voltages is to increase the length of each of the electrode plates relative to its adjacent plate by $\frac{1}{8}$ inch to $\frac{1}{4}$ inch on each end so that the shorter plates are on the outside and the longest plate is in the center.

Conventional polyvinyl chloride tubing or other synthetic plastic material may be used as the housing 37 of the electrocatalytic cell. The electrode plates 38 held within the tubular housing by the castable polymer 39. One such unit, consisting of about fourteen 4 inch by 12 inch plates connected so that the voltage between the plates is about 3 volts or a total of 39 volts operating at about 24 amps when the salt content of the wastewater being treated ranges from 1.5% to 2% by weight is capable of treating about 800 gallons per day of wastewater. Larger or smaller units may be provided depending on the need. The electrode plates are spaced parallel to one another and parallel to the flow of water upward through an inlet opening in cap 41 of the electrocatalytic cell. The outlet in cap 42 connects with line 46 which delivers the treated wastewater to a vertical stand pipe 48. The stand pipe is an integral part of effluent tank 50. Standpipe 48 has an inlet opening near its upper end connecting with line 46 to receive the treated wastewater and a vent opening connecting with vent line 52 and centrifugal blower 54. The effluent tank 50 also contains a discharge opening near the upper end thereof connecting with line 56 for discharge of the treated effluent. A discharge opening in the tank 50 near the lower end connects with line 58 containing valve 60 for recycling of solids which settle to the bottom of the effluent tank back through the macerator unit 22. A further discharge opening connecting with a valved line 62 may be provided for discharge of the treated effluent from the tank when desired. Line 64 connects with valve 34 and line 58 for backflushing of the electrocatalytic cell.

The cell 36 may be backwashed or flushed by connecting a source of seawater to the opening of cap 42 and returning the backflushed water to the retention tank 12 by way of lines 32 and 21 and valve 23. Backflushing of the electrocatalytic cell is generally necessary on a regular basis, depending on the extent of solid materials in the wastewater being treated. These solids tend to lodge in the spaces between the electrodes.

The gases generated by electrochemical action during passage through the cell 36 are entrained in the treated wastewater discharged through line 46 to the stand pipe 48. The blower 54 creates a negative pressure in the standpipe of from 2 to 30 inches of water which separates the entrained gases from the liquid and allows the solid particles in the liquid to settle. Without removal of the entrained solids the solid particles tend to stay suspended. The gases are vented through blower 54 before the treated effluent enters the effluent tank 50.

If the unit is located above the discharge point from tank 50, gravity discharge may be used. If not, the effluent is pumped overboard. As previously mentioned, the effluent tank is equipped with a blowdown connection connecting with line 58 near the bottom of the tank. Under some conditions, there are heavier solid loadings during certain times of the day which are not totally treated during the first run. When these solids settle to the bottom they may be recirculated to the retention tank for reprocessing.

A control panel 68 contains controls for the power supply to the electrocatalytic cell. These controls are contained in a watertight hinged enclosure.

The power supplied the electrocatalytic cell depends on the size of the cell. Generally, the cell is operated at a current density of from 0.3 to 0.5 amperes per square inch. The direct current power supply is controlled to maintain a relatively constant current flow, i.e. 22 amps±5 amps to the electrocatalytic cell for operation using seawater and/or brackish water. The conductivity of the wastewater being treated may vary depending on the relative amounts of seawater and influent wastewater being treated. A solid state insert utilizing state-of-the-art technology is installed in the control panel and is used to automatically maintain a constant electrical current to the electrocatalytic cell by adjusting the direct current voltage to respond to the resistance characteristic of the wastewater being treated and the spacing of the electrode plates of the cell. This voltage variation is maintained by varying the triggering mechanism on dual SCR diode type rectifiers which supply full wave direct rectified current.

For operating the unit the continuous seawater line 28 is turned on allowing seawater to fill the tank 12 to the point where the pumps may be started. The macerator 22 is turned on. After flow has been established throughout the system using seawater, the electrocatalytic cell is energized by pushing the start button located on the control panel. The unit, from this point on, operates on a continuous automatic basis and wastewater may be introduced at any time through line 10 into the surge tank 12. During periods of no wastewater flow, the electrocatalytic cell continues to operate. No harm is done to the system as long as the seawater line remains operating. The amount of seawater entering the system is controlled and regulated by the restriction orifice 30 to maintain a relatively constant minimum flow through the cell. The effluent tank is blown down periodically to return the settled effluent through valve 60 and line 58 to the macerator. Occasionally, the electrocatalytic cell may be backwashed to return any trapped solid particles lodged between the parallel electrode plates. The unit automatically shuts down if an overvoltage or overcurrent situation exists. Upon shut down an alarm sounds indicating that maintenance is required. During operation the direct current and voltage are regulated automatically. Should there be a malfunction, an alarm sounds. Normally the unit is designed to operate on a continuous 24-hour basis with the surge tank compensating for uneven flows during the operating day. In addition to backflushing of the electrocatalytic cell occasionally, it is also necessary, occasionally, to reverse the polarity on the electrode plates in the electrocatalytic cell for cleaning. This is generally done by employing a reversing switch which reverses current delivered to the end electrode plates. It is important that the current reversal be carried out for relatively short periods of time at an extremely low current density as, for example, 10% of the normal operating current density of from 0.3 to 0.5 amperes per square inch. When the cell is restarted after reversal of the polarity, the solid particles adhered to the plates are removed in approximately 10 to 30 minutes. After the polarity of the cell has been reversed for some period of time, it is generally again backwashed to dislodge any particles which may be lodged between the plates. The electrode plates may also be chemically cleaned with appropriate chemicals such as hydrochloric acid.

During periods of operation, the effluent discharged from the effluent tank generally has a total suspended solids content of less than 100 parts per million, no fecal organism count and very low BOD. Other advantages of the unit include no odor and no need for chemical additives. The unit which may be operated continuously or shut down and may be used to retrofit existing vessels.

We claim:

1. A compact unit for treatment of waste water which uses no chemical additives and which yields a discharge effluent low in suspended solids and essentially free of pathogenic organisms, comprising:

an elongated electrocatalytic cell having an inlet and outlet containing, between the inlet and outlet, closely spaced, vertically oriented electrodes positioned parallel to one another and parallel to the flow of waste water therethrough, the electrocatalytic cell positioned for flow of waste water to be treated upwardly from the inlet thereof to the outlet, a closed surge vessel for gravity separation of heavy solids from the waste water to be treated and for evening out the flow of waste water to be treated to the electrocatalytic cell, having an inlet opening to receive the waste water to be treated, a vent opening connected to a vent line, and a discharge outlet, a macerator means connected to the discharge outlet of the surge vessel for receiving waste water to be treated from the surge vessel and macerating the solids contained therein and delivering the waste water to be treated containing the macerated solids to the inlet of the electrocatalytic cell, means for adding a sufficient amount of electrolyte to the waste water to be treated before entry thereof into the electrocatalyic cell for effective operation of the cell, means connected to the surge vessel for injecting water thereinto in amounts sufficient to maintain a relatively constant minimum flow of water to be treated through the electrocatalytic cell at all times so as to allow continuous operation of the electrocatalyic cell during times when no waste water to be treated is entering the surge vessel, a closed effluent vessel having a stand pipe therein connected to the discharge outlet of the electrocatalytic cell, the stand pipe including a vent opening therein for venting of entrained gases in the treated waste water, means to create a negative pressure in the stand pipe, and power means connected to the electrodes of the electrocatalytic cell for delivering direct current to the electrode plates within the cell, the power means charging the spaced electrode plates with an electrolyzing current for generation of chlorine, oxygen, and other disinfecting chemicals in situ.

2. The unit of claim 1, including control means connected to the power means for automatically adjusting the direct current voltage supplied to the electrode plates to maintain a constant current between the plates.

3. The unit of claim 1 wherein the means for creating a negative pressure in the stand pipe is a blower connected to the stand pipe for venting gases to the atmosphere.

4. The unit of claim 1 wherein the means for maintaining a relatively constant minimum flow of waste water through the electrocatalyic cell at all times includes a restricted orifice through which water containing a chloride salt electrolyte is injected.

5. The unit of claim 1, including means for removing settleable solids from the effluent vessel and mixing them with waste water to be treated for reprocessing through the electrocatalytic cell.

6. The unit of claim 5 wherein the means for removing the settleable solids and mixing them with waste water includes suitable valving for directing flow from the effluent vessel into the electrocatalytic cell.

* * * * *